United States Patent [19]
Meier-Burkamp et al.

[11] Patent Number: 5,540,456
[45] Date of Patent: Jul. 30, 1996

[54] MULTISPEED HUB FOR A BICYCLE

[75] Inventors: Gerhard Meier-Burkamp, Bergrheinfeld; Werner Steuer, Schweinfurt, both of Germany

[73] Assignee: Fichtel & Sachs AG, Schweinfurt, Germany

[21] Appl. No.: 377,476

[22] Filed: Jan. 24, 1995

[30] Foreign Application Priority Data

Jan. 27, 1994 [DE] Germany ............................ 44 02 344.8

[51] Int. Cl.$^6$ .................................................. B62M 11/16
[52] U.S. Cl. ............................ 280/236; 280/238; 74/372; 192/64; 475/271
[58] Field of Search .................................. 280/236, 238; 192/4 R, 6 A, 64; 475/271, 275, 283, 289, 292; 74/371, 372; 474/160

[56] References Cited

FOREIGN PATENT DOCUMENTS

| 0383350 | 8/1990 | European Pat. Off. . |
| 0859274 | 12/1940 | France . |
| 1081334 | 5/1960 | Germany . |
| 4142867 | 7/1992 | Germany . |

Primary Examiner—Margaret A. Focarino
Assistant Examiner—Victor E. Johnson
Attorney, Agent, or Firm—Nils H. Ljungman and Associates

[57] ABSTRACT

A hub for a bicycle can typically have an axle for being non-rotationally connected to a frame of the bicycle, a hub body rotatably mounted about the axle, and a drive element rotatably mounted on the axle. A plurality of transmission elements can preferably be disposed between the axle and the hub body for transmitting a drive force from the drive element to the hub body, and a selection between various gearing ratios provided by the transmission elements can preferably be provided by a selectively engageable ratchet mechanism and a control device for selectively engaging and disengaging the ratchet mechanisms. The ratchet mechanism can be provided by at least one pawl, biased radially inward by at least one spring, to non-rotationally couple a ring body in one direction of rotation with the axle. There can also be a control device running parallel to the hub axle to control the engagement of the pawl between the ring body and the axle, whereby the control device can have a control plate with at least one cam. The cam can be configured to disengage the ratchet mechanism. Such a device is advantageous for shifting ratchet mechanisms, even under load, and makes it possible to engage or disengage more than one ratchet mechanism with a single control plate.

20 Claims, 7 Drawing Sheets

MULTISPEED HUB FOR A BICYCLE

BACKGROUND OF THE INVENTION

1. Field of the Invention

This invention generally relates to a multi-speed hub for a bicycle. Such a hub can typically have a shaft, or hub axle, for being non-rotationally connected to a frame of the bicycle, a hub body rotatably mounted about the fixed shaft, and a drive element rotatably mounted on the fixed shaft. A plurality of transmission elements can preferably be disposed between the shaft and the hub body for transmitting a drive force from the drive element to the hub body. A selection between various gearing ratios provided by the transmission elements can preferably be provided by a selectively engageable ratchet mechanism and a control device for selectively engaging and disengaging the ratchet mechanisms.

More particularly, the present invention relates to such a control device for ratchet mechanisms for a multispeed drive hub of a bicycle. In general, the ratchet mechanism can preferably be formed by at least one pawl biased radially inwardly toward the stationary shaft by means of at least one spring, whereby this ratchet mechanism can, in one direction of rotation, non-rotationally couple a rang body, disposed about the axle, with another rotational body, in particular, the stationary hub axle. In addition, there can also be at least one control device running parallel to the hub axle to control the engagement of the pawl between the ring body and the hub axle.

2. Background Information

One type of control device for ratchet mechanisms, in particular for multispeed drive hubs of a bicycle, is disclosed in European Patent Application No. 0 383 350, where several ratchet mechanisms can be controlled by means of a twistable gearshift sleeve located outside the hub. On the hub described in European Patent Application No. 0 383 350, the pawls are supported on arresting teeth which are molded onto the hub axle, and the pawls are engaged and disengaged by means of apertures, control edges and bevels of the multi-part gearshift sleeve, to engage or disengage the respective connection between the pawl and the arresting teeth. If a load is to be applied to the respective pawl, this ratchet connection can only be disengaged at a point in the driving operation when the torque is low, since the bevels on the shifting sleeve cannot be made arbitrarily flat. The control device claimed by the present invention, in contrast to the known devices, lifts the pawl directly with an optimal bevel directly to a cam, whereby the angle of the bevel can be adapted to the requirements for the lifting force. It has also been determined that it would be advantageous if several cams with bevels can be located on one control plate, as this should not adversely affect the very favorable installation capabilities for the control plates.

OBJECT OF THE INVENTION

The object of the present invention is therefore to create a control device for ratchet mechanisms for multispeed drive hubs, which control device can control more than one ratchet mechanism in the axial direction on a hub axle, without additional expense for construction.

SUMMARY OF THE INVENTION

The present invention teaches that this object can be accomplished by a control device which preferably has at least one control plate that is located in at least one groove of the axle, which groove can be defined by a groove base and groove sides, and in which groove, the control plate can be displaced longitudinally along a surface line of the hub axle. This control plate can preferably have at least one cam, which cam can be engaged with, or disengaged from at least one pawl to disengage and engage the at least one pawl with the axle.

In one advantageous embodiment of the present invention, the pawls are preferably mounted in a ring body which encircles the axle. In essence, any ring-shaped body within the hub which is selectively non-rotationally engageable and disengageable with another body can be provided with such a ratchet mechanism. For example, such a ring body can possibly be a sun gear of the multi-speed hub, thereby enabling the sun gear to be engaged with and disengaged from the axle. When engaged, the pawls can preferably be braced against a side of the groove against the hub axle to transmit torque between the hub axle and the ring body. In other words, in at least one preferred embodiment of the present invention, to non-rotationally engage the ring body with the hub axle, the pawls can preferably be braced against a side of the groove against the hub axle.

In an additional advantageous embodiment of the present invention, the groove side which will be engaged by the pawls can preferably have a bevelled portion. This bevelled portion can preferably be angularly disposed to provide an engagement surface for securely retaining the pawl thereagainst when the pawl is engaged with the bevelled portion. The bevelled portion should preferably be disposed to keep the pawl from slipping radially outwardly under pressure.

To provide an easier engagement and disengagement between the cam of the control plate and the pawls, to raise and lower the pawls, the control plate preferably has a forward bevel and a rear bevel, each of which preferably runs in the direction of displacement toward the cam. Thus, the cam can preferably be gradually engaged with the pawls in both a forward, and a rearward direction of movement of the control plate within the groove.

In one preferred configuration of the present invention, the cam can preferably have a cross-section which matches the cross section of the groove, whereby the lateral contour approximately matches the groove sides and the bevels, and the height of the cam approximately matches the circumference of the hub axle.

In one additional preferred configuration, the pawls can preferably have a ramp for guiding the pawls rotationally over the cams when the guide ring is rotating with respect to the hub axle. Such ramps can preferably avoid any unwanted engagement between the pawls and the groove sides, or between the pawls and the cam, when the pawls are rotating over the cam and groove.

A more detailed description of the present invention and the various embodiments thereof is provided herebelow with reference to the accompanying figures. It should be understood that when the word "invention" is used in this application, the word "invention" includes "inventions" that is the plural of "inventions". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a multi-speed hub for a bicycle having a frame, at least one wheel, and the multi-speed hub for mounting the at least one wheel to the frame, the hub comprising: a shaft for being non-rotationally connected to a frame of a bicycle; input apparatus for inputting rotational power to the hub; sleeve disposed concentrically about the shaft for receiving rotational power from the input apparatus and for outputting rotational power to the at least one wheel, the sleeve comprising apparatus for being connected to the at least one wheel; transmission apparatus disposed within the sleeve about the shaft, the transmission apparatus comprising: at least one sun gear disposed about the shaft apparatus, the at least one sun gear having an inner portion disposed adjacent the shaft apparatus; at least one planet gear disposed adjacent the at least one sun gear and meshed with the at least one sun gear; at least one ring gear disposed concentrically about the at least one sun gear and disposed about the at least one planet gear, the at least one ring gear being meshed with the at least one planet gear; the at least one sun gear comprising: a first member disposed on the inner portion of the at least one sun gear; and apparatus for biasing the first member towards the shaft; the shaft comprising: apparatus for engaging the first member of the at least one sun gear for non-rotatably engaging the at least one sun gear with the shaft; apparatus for withdrawing the first member out of engagement with the apparatus for engaging and blocking re-engagement of the first member with the apparatus for engaging to enable rotation of the at least one sun gear about the shaft; and apparatus for longitudinally displacing the apparatus for withdrawing between at least a first position with the first member engaged with the apparatus for engaging, and at least a second position with the first member blocked from engaging with the apparatus for engaging.

Another aspect of the invention resides broadly in a controllable ratchet mechanism for a drive hub of a bicycle, the hub defining a longitudinal axis, and the hub comprising a first member and a second member with the second member disposed about the first member, the first member having an outer surface disposed towards the second member, and the second member having an inner surface disposed towards the first member, the first and second members being selectively rotatable relative to one another, and selectively non-rotatably engageable with one another, the ratchet mechanism comprising: at least one pawl pivotably mounted on the inner surface of the second member, the at least one pawl having a first end mounted to the second member and a second end opposite the first end; apparatus for engaging the second end of the at least one pawl for non-rotatably engaging the first member and the second member, the first member comprising the apparatus for engaging; control apparatus for controlling engagement and disengagement of the at least one pawl between the second member and the first member, the first and second members being relatively rotatable with respect to one another upon disengagement of the at least one pawl, and the first and second members being non-rotatably engaged with one another upon engagement of the at least one pawl, the control apparatus comprising: at least one third member for disengaging the at least one pawl from the apparatus for engaging and for blocking re-engagement of the at least one pawl with the apparatus for engaging to enable relative rotation between the first and second members; and apparatus for longitudinally displacing the third member between at least a first position with the at least one pawl engaged with the apparatus for engaging, and at least a second position with the at least one pawl blocked from engaging with the apparatus for engaging.

BRIEF DESCRIPTION OF THE DRAWINGS

Several embodiments of a control device for ratchet mechanisms for multispeed hubs, and multispeed hubs in general, are explained in greater detail below, with reference to the accompanying drawings, in which.

DESCRIPTION OF THE PREFERRED EMBODIMENTS

Figure 1:
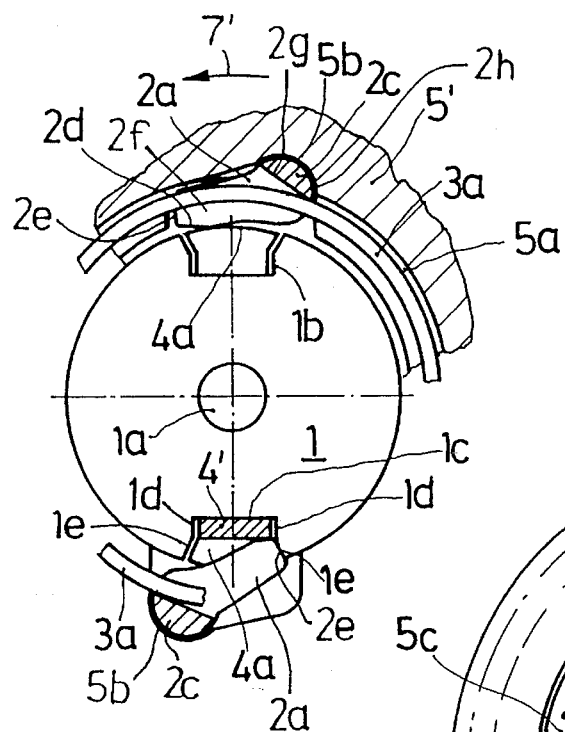
FIG. 1 shows a control device for ratchet mechanisms for a hub axle, a ring body, pawls, two grooves and two control plates, in cross section.
Figure 1A:
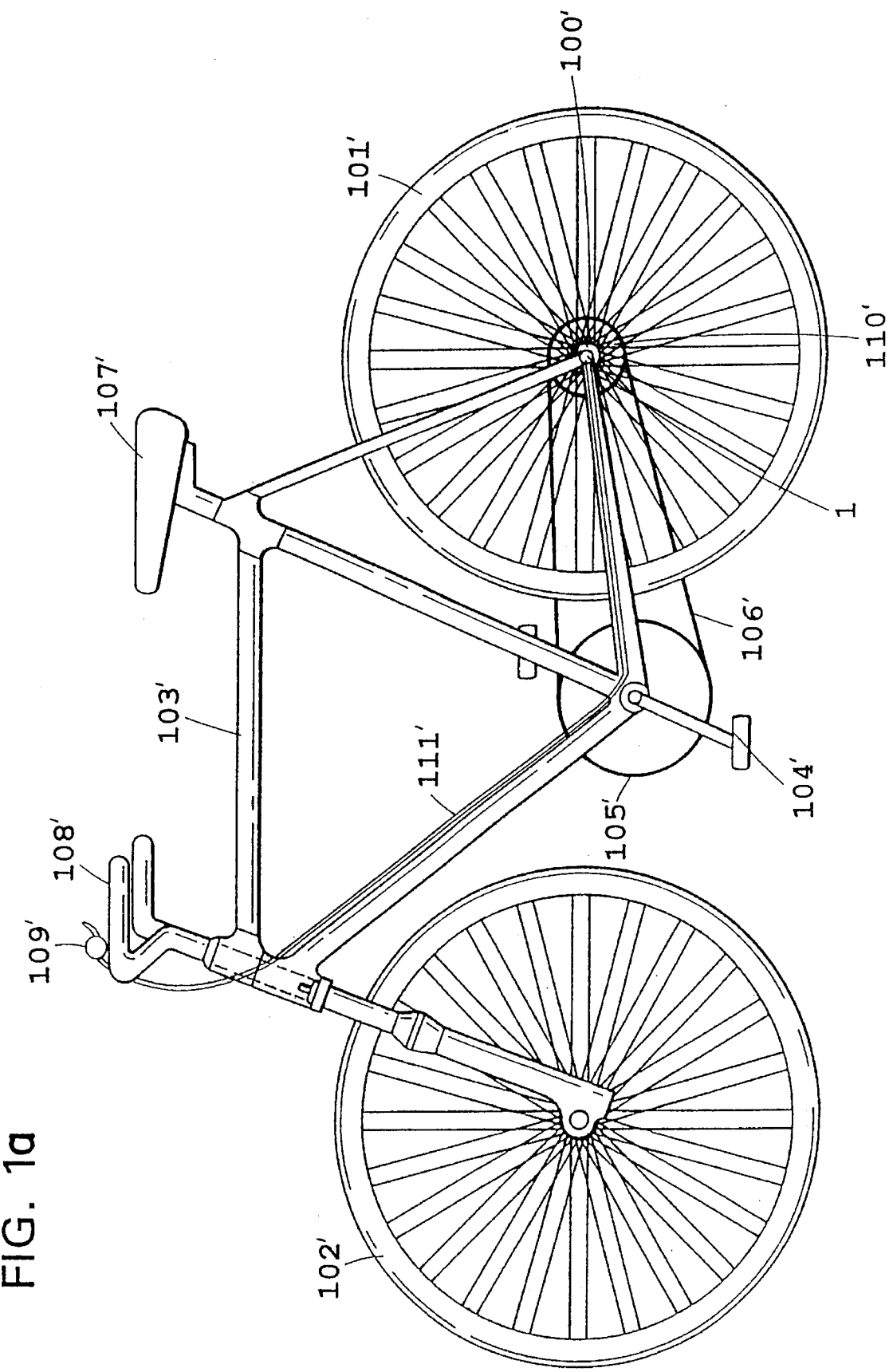
FIG. 1a generally shows a bicycle and components thereof.

For a better understanding of the overall concept of the present invention, a general depiction of a bicycle having a multi-speed hub 100' on a rear wheel 101' thereof is provided in FIG. 1a. The hub 100' can have a hub axle 1, by means of which the hub 100' can be attached to a frame 103' of the bicycle. The frame 103' can also preferably support a front wheel 102'. A chain 106' and pedal system 104', 105' can preferably be provided to transmit a drive power to the hub 100' and a rear wheel 101'. The pedals 104' are preferably attached to a drive sprocket 105', the outside of which sprocket 105' preferably engages the chain 106'. The chain 106' is also preferably engaged about the hub 100' by means of an additional drive sprocket 110'. In addition to the above, seat 107' can preferably be provided for the rider, while handlebars 108' can be provided for steering purposes. On the handlebars 108' there can also preferably be a gear shifting device 109' for shifting the gears of the multi-speed hub 100'. The shifting device 109' can preferably be operatively connected to the hub 100' by means of cables 111' that are fastened along the frame of the bicycle and preferably extend from the shifting device 109' to the hub 100'. Such cables 111' and shifting devices 109' are typically well known and are therefore not discussed in any further detail herein.

Figure 4:
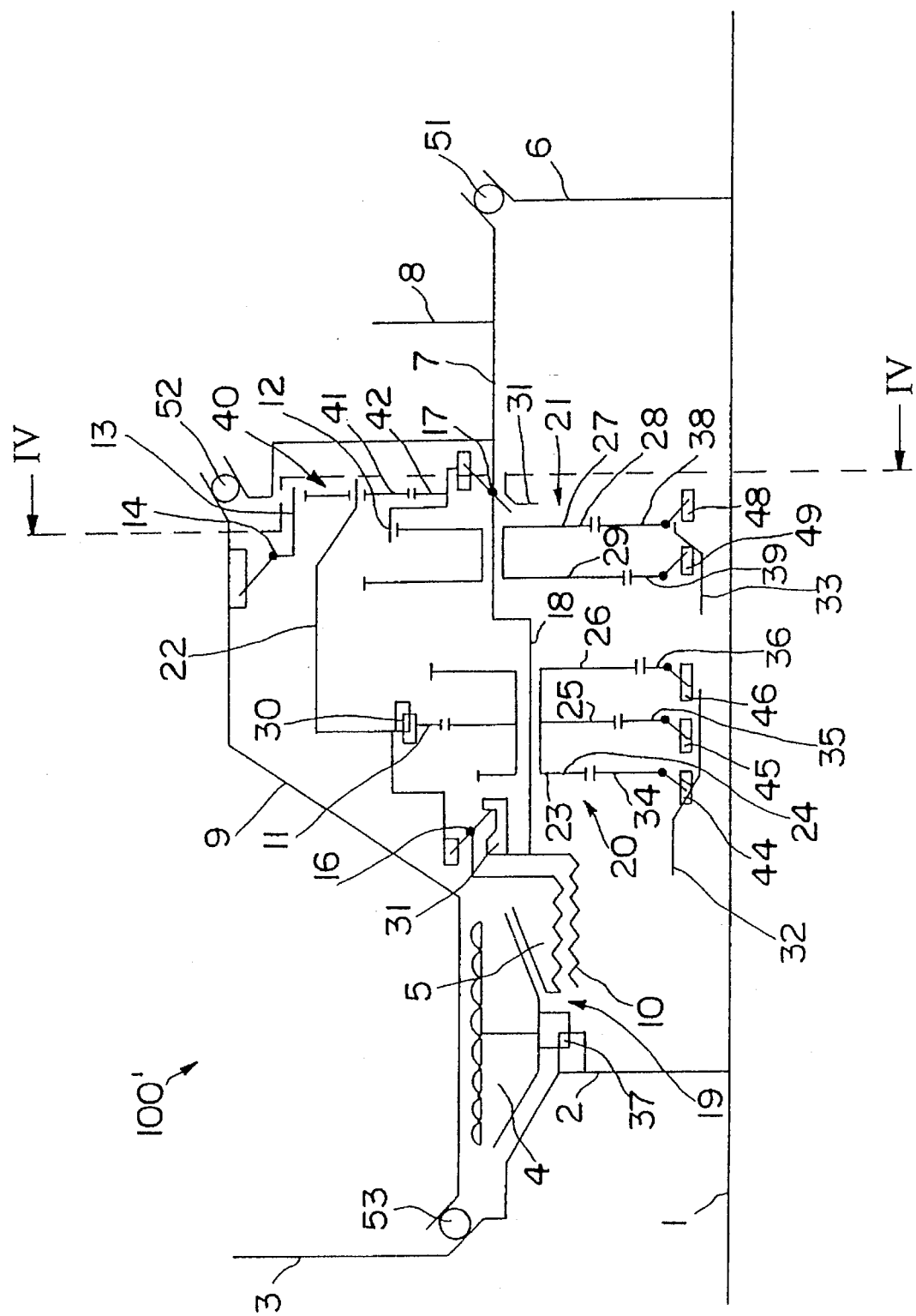
FIG. 4 shows a schematic diagram of a hub shift transmission of a multi-speed hub.
Figure 4A:
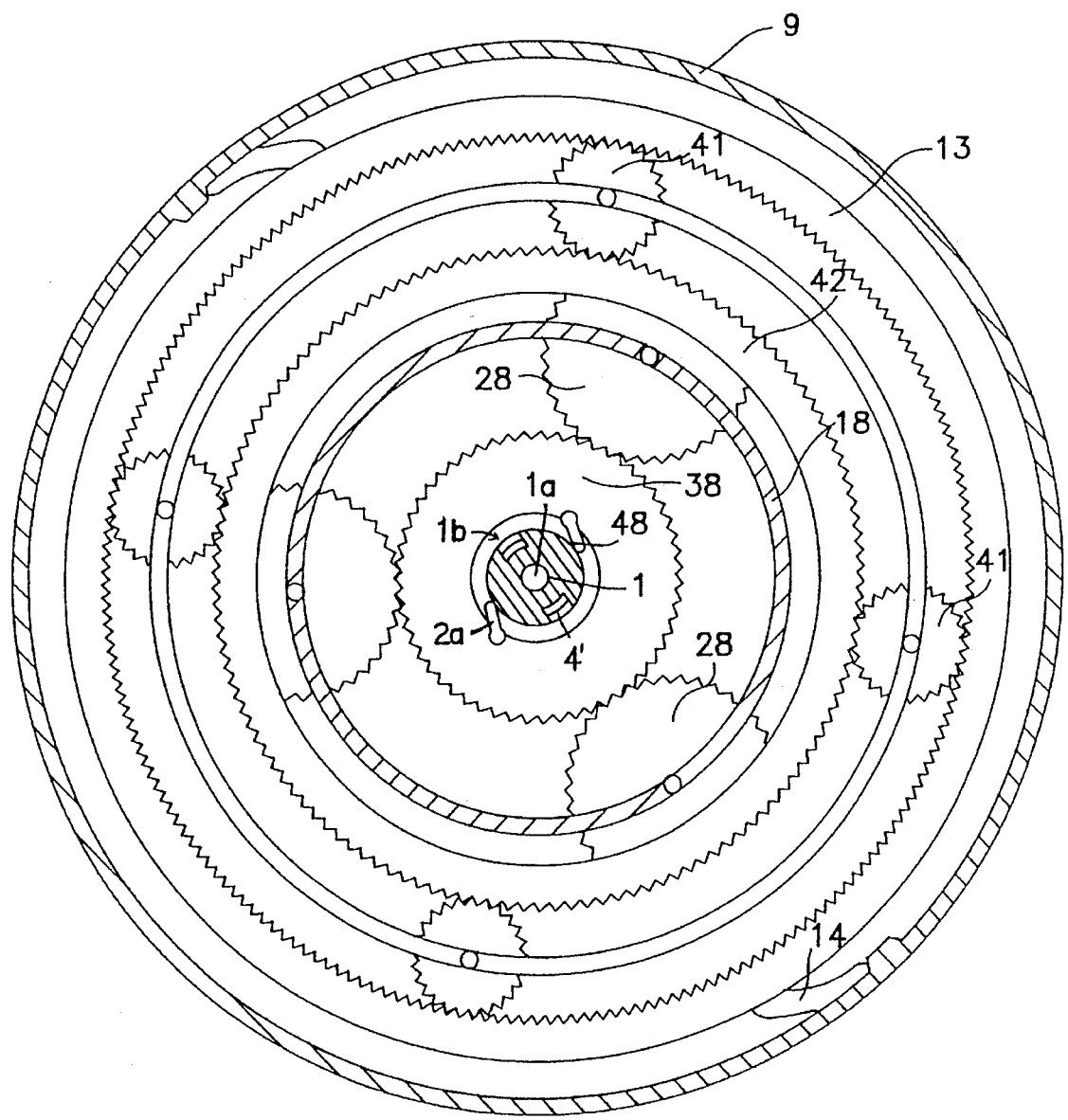
FIG. 4a shows a simplified sectional view of the hub shift transmission taken along the line IV—IV of FIG. 4.

A multi-speed hub 100' will now be further explained with relation to FIGS. 4 and 4a. As schematically illustrated in FIG. 4, within the hub 100', there can preferably be a hub shift transmission. The hub 100', and thus the hub shift transmission, can essentially be connected to the bicycle frame by means of a hub axle 1. A lever cone 2 can preferably be fastened non-rotationally to the hub axle 1, and can preferably be fixed in the axial direction on the hub axle 1. A lever 3 of the lever cone 2 can be braced against the bicycle frame 103' (see FIG. 1a) to further ensure a torsional strength of the hub 100'. Preferably rigidly connected to the side of the hub axle 1 opposite the lever cone 2 there can be a fixed cone 6, which by means of a first bearing 51 can provide the bearing base for a driver 7. On the driver 7, a driving pinion 8 can preferably be non-rotationally mounted. Such a driving pinion 8 can preferably comprise the sprocket 110' (as discussed above with reference to FIG. 1*a*).

On the largest diameter of this driver 7 there can preferably be a second bearing 52 to connect the driver 7 with a hub sleeve 9. In addition, the hub sleeve 9 can preferably be braced against the lever cone 2 by means of a third bearing 53. The driver 7 can preferably be non-rotationally connected to a first planetary carrier 18, on which a first multi-stage planet wheel 23 and a second multi-stage planet wheel 27 are preferably rotationally mounted. The first multi-stage planet wheel 23 essentially can belong to a first planetary gear set 20 with a first ring gear 11 and at least one sun wheel, wherein sun wheels 34, 35 and 36 are shown. The second multi-stage planet wheel 27 essentially can belong to a second planetary gear set 21 with a second ring gear 12 and at least one additional fun wheel, wherein sun wheels 38 and 39 are shown.

In the case of the embodiment shown in FIG. 4, the first multi-stage planetary gear set 20 can preferably be a three-stage gear set, and the first multi-stage planet wheel 23 can comprises the stages 24, 25 and 26 of increasing diameter. In the second multi-stage planetary gear set 21, the second multi-stage planet wheel 27 can analogously have at least two stages 28 and 29 of increasing diameter. The corresponding sun wheels 34, 35, 36, 38 and 39, located around the hub axle 1, can be connected to the hub axle 1 by means of free wheels 44, 45, 46, 48 and 49. These free wheels 44, 45, 46, 48 and 49 are preferably rotatable in only one direction of rotation, and can preferably have a blocking device for blocking rotation in the opposite direction.

The free wheels 44, 45, 46, 48 and 49 can preferably be actuated along the hub axle 1 from outside the hub shift transmission by means of suitable control units 32 and 33. In general, such control units can be actuated by means of the shifting mechanism 109' as discussed earlier with reference to FIG. 1*a*, and the cables 111', which cables can be connected to the control units 32 and 33, as will be discussed in more detail herebelow. By means of the shifting mechanism 109' (see FIG. 1*a*) and the control units 32 and 33, various gear ratios can essentially be achieved inside the hub shift transmission by selectively activating or deactivating the free wheels 44, 45, 46, 48 and 49. In at least one embodiment of the present invention, such selection or actuation of the free wheels 44, 45, 46, 48 and 49 can essentially comprise connecting the free wheels 44, 45, 46, 48 and 49 to the hub axle I to be held by the hub axle 1.

Figure 2:
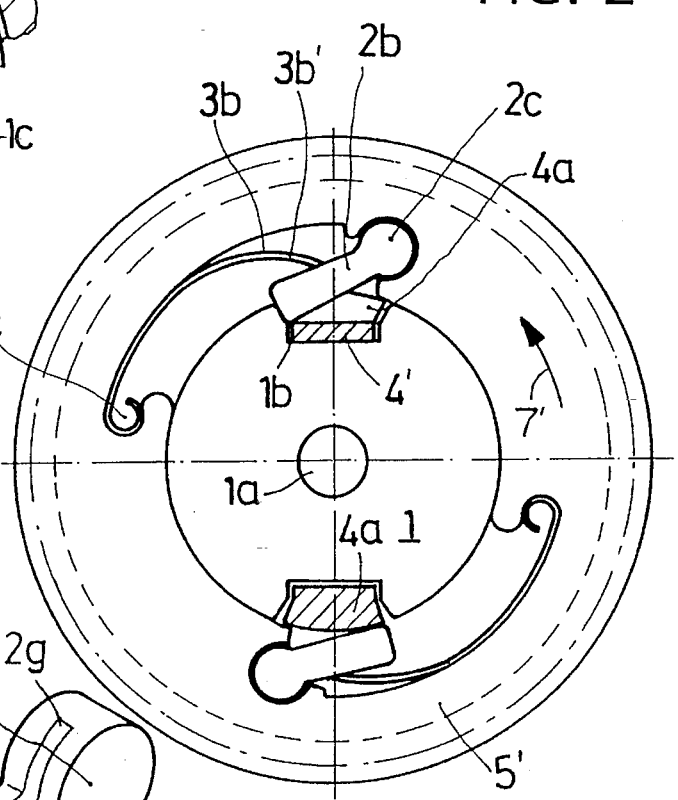
FIG. 2 shows the control device illustrated in FIG. 1, with a modified ratchet installation.
Figure 3:
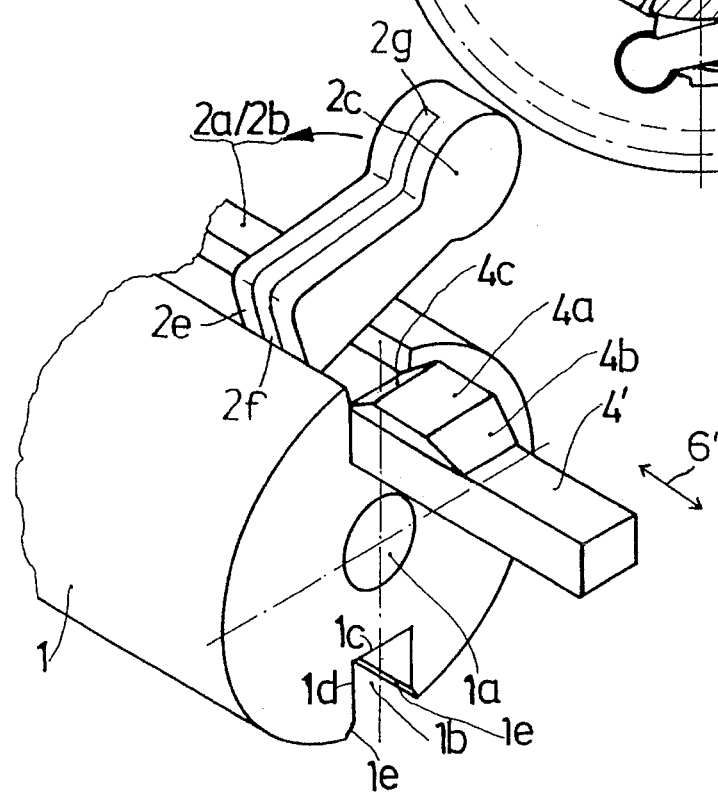
FIG. 3 shows the control plate with a cam, a forward bevel and a rear bevel, in a perspective view.

In at least one embodiment of the present invention, one type of device by means of which the free wheels 44, 45, 46, 48 and 49 can be connected to the hub axle 1, is depicted in FIGS. 1–3. The use of the device as depicted in FIGS. 1–3, is however not meant to be limiting to the use for connecting free wheels to the hub axle, but in essence, any cylindrical body which can be selectively engaged and disengaged with another cylindrical body within the hub could utilize such an arrangement, for example, the clutch devices 14, 16 and 17 as discussed further hereinbelow, could also possibly be operated in a similar manner. In FIGS. 1–3, the hub axle 1 of a multi-speed hub is shown with a central longitudinal bore 1*a* located therein. As briefly discussed above, this longitudinal bore 1*a* can be used for control purposes for controlling activation and deactivation of the free wheels. On at least one surface line, along a substantially longitudinal dimension of the hub axle 1, there can preferably be grooves 1*b* (in the depicted embodiment, two such grooves 1*b* are shown). The contours of each of the grooves 1*b* can preferably be formed by a groove base 1*c* and two groove sides 1*d*, wherein the sides 1*d* can preferably include molded bevels 1*e*.

Pawls 2*a*, as shown in FIG. 1, can preferably have a head portion 2*c*, which head 2*c* can preferably be mounted to pivot in bearing points 5*b* of a ring body 5'. Such a ring body 5' can be, in at least one preferred embodiment of the present invention, one of the free wheels 44, 45, 46, 48 and 49 as discussed above, which free wheels, can in essence, be a part of the sun wheels 34, 35, 36, 38 and 39. The pawls 2*a* can preferably have a surface 2*e* for interacting with one of the two molded bevels 1*e*. The pawls 2*a* are preferably slotted longitudinally, to provide a slot of (shown in better detail in FIG. 3) preferably from the surface 2*e* towards the head 2*c* and ending at base 2*g*. As such, a spring collar, or annular spring 3*a*, which acts radially outwardly, can engage a remaining edge 2*h* of the bevelled groove base within the head 2*c*. In this manner, the pawls 2*a* can be pivoted inwardly, employing the rocker am principle, as the spring 3*a* pushes the edge 2*h* outwardly. The annular spring 3*a* can preferably be located in an annular groove 5*a* of the ring body 5'.

Within the grooves 1*b*, there can preferably be a control body, or plate 4' for positioning the pawls 2*a*. As shown in the upper half of FIG. 1, a pawl 2*a*, on account of the spring force of the annular spring 3*a*, can preferably be in contact radially inwardly against a cam 4*a*, which cam 4*a* can preferably be molded onto the control plate 4'. The cam 2*a* can preferably be connected to the control plate 4' in a shaped, or tapered manner by means of a forward bevel 4*b* and a rear bevel 4*c* as shown in FIG. 3. Alternatively, when the cam 4*a* is displaced in the direction of arrow 6' (shown in FIG. 3), by the displacement of control plate 4', the pawl 2*a* can then essentially pivot into the groove 1*b* as shown in the lower half of FIG. 1, wherein the surface 2*e* can then preferably engage with the bevel 1*e*.

If, as shown in FIG. 3, when a pawl 2*a* is pivoted into a slot 1*b*, and the control plate 4' is pushed with its cam 4*a* against the pawl 2*a*, the rear bevel 4*c* can first act on the pawl 2*a*, to raise the pawl 2*a* completely to the level of the cam 4*a* (as shown in the upper half of FIG. 1). The cam 4*a* now lies under the pawl 2*a*, as a result of which the pawl 2*a* can be disengaged from the bevel 1*e*. Upon disengagement, the pawl 2*a* and ring body 5*a* can essentially rotate freely and without resistance in the direction of rotation 7' in which direction 7' the pawl had previously been braced from rotating. This free rotation can be accomplished, on one hand, by means of the curved upper contour of the cam 4*a*, which contour preferably approximately matches the circular contour of the hub axle 1. On the other hand, a ramp 2*d* can preferably be molded onto the pawl 2*a*, which ramp 2*d* can preferably help to overcome any gaps between the cam 4*a* and the transition from the bevel 1*e* to the cylindrical portion of the hub axle 1, when the ring body 5' is rotating in the support, or engaging, direction of rotation 7'.

Thus, by selectively positioning the control plate 4' within the grooves 1*b*, the operator of the bicycle can selectively engage and disengage various ones of the freewheels 44, 45, 46, 48 and 49, and thus, the sun wheels 34, 35, 36, 38 and 39, with the hub axle 1, thereby causing a shifting of the gearing ratios within the hub 100'. Such a shifting operation will be further discussed herebelow with reference to FIG. 4.

FIG. 2 shows a variant configuration of the ratchet mechanism illustrated in FIG. 1. In this case, as in FIG. 1, the purpose is to apply a bias to a pawl 2*b* to pivot the pawl 2*b* inwardly. However, in contrast to FIG. 1, the bias in FIG. 2 is provided by an inwardly-acting portion 3b' of a leg spring, or torsional spring 3b, which engages the pawl 2b with the bevels 1e. The leg spring 3b can be positively located in a fastening point 5c within the ring body 5', and can apply pressure to the pawl 2b with its free leg 3b' to thereby force the pawl inwardly into engagement with the groove 1b when the cam 4a is not disposed therebelow.

Figure 6:
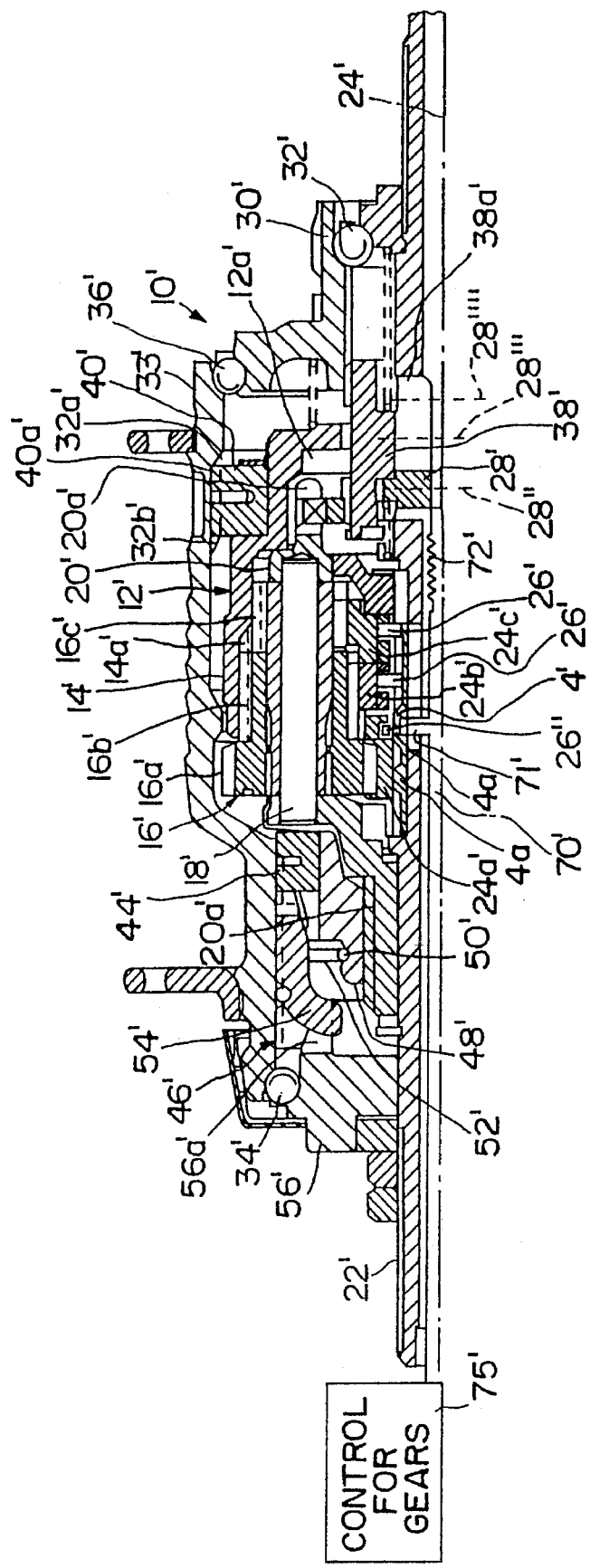
FIGS. 6 shows a sectional view of another embodiment of a bicycle hub depicting in more detail the components of the hub in conjunction with the control device of FIG. 1.

In at least one embodiment of the present invention, the control plate 4' could be provided with two such dams 4a, as shown in FIG. 6, thereby enabling activation and deactivation of two ring bodies 5' with a single control plate 4'.

It is advantageous for the configuration of the multispeed hub that the hub axle 1 preferably have the central hole 1a, because this central hole 1a can form an additional control capability for the actuation of the control plate 4'. In essence, this can preferably be accomplished by means of pusher blocks (shown in more detail in FIG. 6), which can be connected through slots to the control plates 4'. Furthermore, spring, or biasing devices (not shown) can be located in the central hole 1a, against which the control plates 4' can also be supported by means of pusher blocks. The control plates 4' could also preferably be controlled directly with the assistance of a shifting device on at least one end of the hub axle 1.

Figure 5:
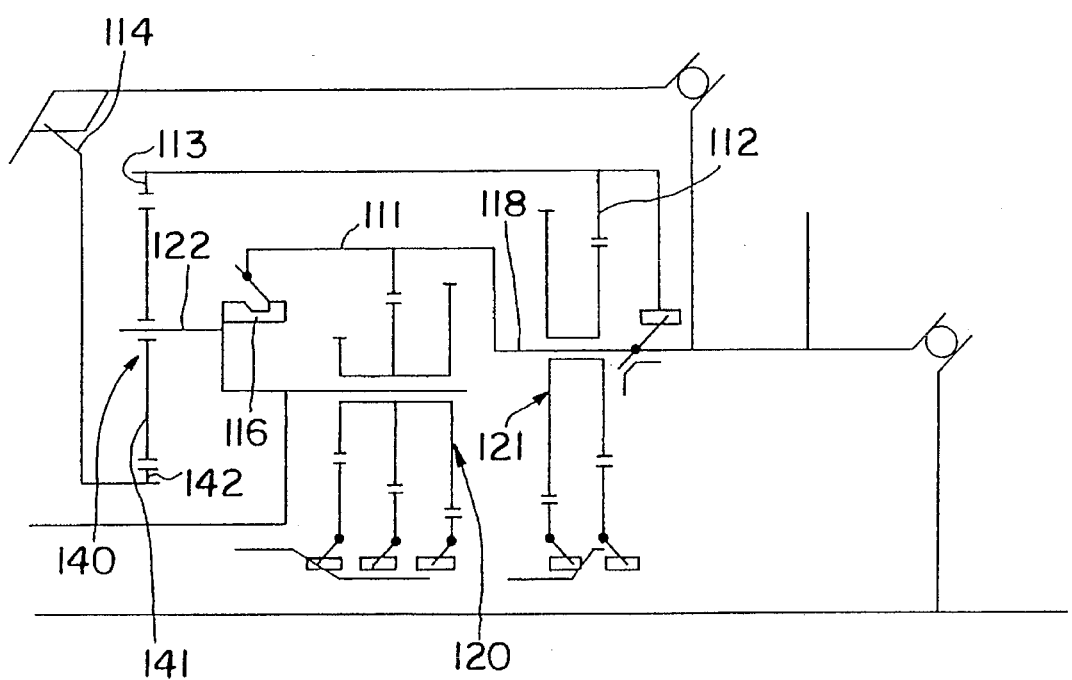
FIGS. 5 and 5a show additional variants of a hub shift transmission.

FIG. 5 illustrates a variant of the hub shift transmission shown in FIG. 4. In essence, for purposes of simplicity, FIG. 5 has labels only for parts and/or elements of this hub shift transmission which differ from those of the hub shift transmission shown in FIG. 4, but have a similarity in terms of function or appearance. These parts are identified with numbers which are greater by 100 than the numbers used in FIG. 4. The remaining unnumbered parts are essentially the same as the parts labelled in FIG. 4, and thus, any reference herebelow to unlabelled elements of FIG. 2 can essentially be referred to in FIG. 1.

In FIG. 5, the arrangement of the hub axle 1, the lever cone 2 with the lever 3, the fixed cone 6, the first multi-stage planetary gear set 20, the second multi-stage planetary gear set 21 and also the sun wheels 34, 35, 36, 38 and 39 with their free wheels 44, 45, 46, 48 and 49 on the hub axle 1, essentially corresponds to the arrangement described above with respect to FIG. 4. The driver 7 can likewise be braced against the fixed cone 6 by means of the first bearing 51 and against a modified hub sleeve 109 by means of the second bearing 52, which hub sleeve 109 can preferably roll along the lever cone 2 by means of the third bearing 53. The driver 7 can preferably be non-rotationally connected with a first planetary carrier 118, on which the first multi-stage planet wheel 23 and the second multi-stage planet wheel 27 can preferably be rotationally mounted. The first multi-stage planet wheel 23 essentially belongs to a first planetary gear set 120 with a first ring gear 111 and the sun wheels 34, 35 and 36. The second multi-stage planet wheel 27 essentially belongs to a second planetary gear set 121 with a second ring gear 112 and with sun wheels 38 and 39. In the case of the embodiment illustrated in FIG. 5, the first multi-stage planetary gear set 120 can also preferably be a three-stage gear set, and the first multi-stage planet wheel 23 can comprise the stages 24, 25 and 26. In the second planetary gear set 121, the second multi-stage planet wheel 27 can analogously have at least two stages 28 and 29.

Figure 5A:
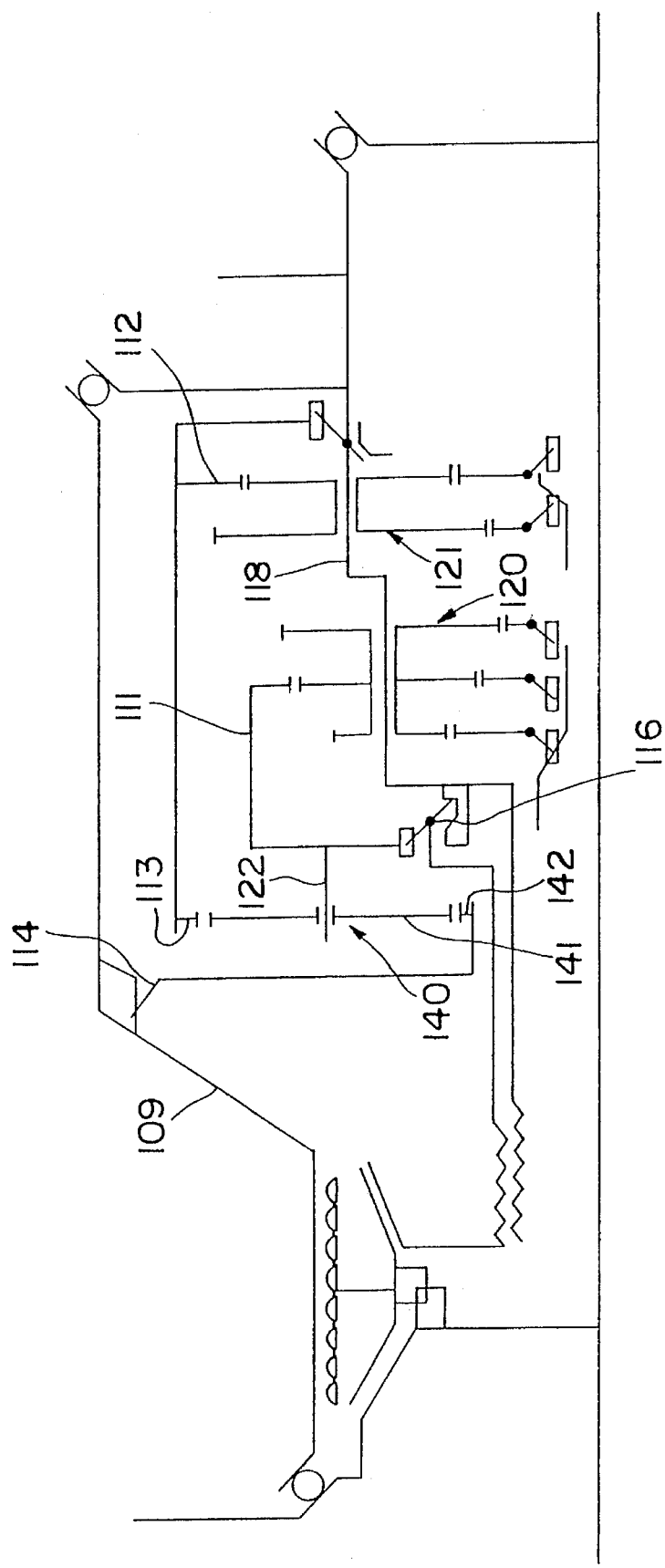

Another possible variant which might be able to be provided in accordance with the present invention is depicted in FIG. 5a, wherein the drive 118 forms an integral part of the ring gear 111, and the planet carrier 122 acts as planet carrier for planetary gear 140 as well as planetary gear 120. Such an embodiment might be able to provide alternative gearing ratios as can be provided by the embodiment of FIG. 5.

As indicated in FIG. 4, the free wheels 44, 45 and 46 of the sun wheels 34, 35 and 36 are preferably oriented in the opposite direction of rotation from the free wheels 48 and 49 of the sun wheels 38 and 39, where the sun wheels 34, 35 and 36 can preferably freewheel backward on the hub axle 1, and the sun wheels 38 and 39 can preferably freewheel forward.

Now, with reference to both FIGS. 4 and 5, one clutch device 16 and one clutch device 17, each acting in a single direction of rotation, can preferably be located on the planetary carriers 18, 118 on both sides of the planetary gear sets 20, 120 and 21, 121, when viewed axially. The clutch device 16 preferably drives in the driving direction of rotation, and the clutch device 17 preferably drives in the reverse direction of rotation. The driving side clutch device 17 preferably interacts with the second ring gear 12, 112 and the lever-cone-side clutch device 16 preferably interacts with one of the second planetary carriers 22, 122, whereby in the variant illustrated in FIG. 4, this clutch device 16 can preferably be non-rotationally connected to the second planetary carrier 22, via the ring gear 11 by means of a dog clutch 30. In the variant illustrated in FIG. 5, the first planetary carrier 118 essentially interacts directly with the first ring gear 111 via the clutch device 116, which ring gear 111 can again be connected to a second planetary carrier 122.

With reference to FIGS. 4 and 5, the second planetary carrier 22, 122 can essentially be an integral component of a differential planetary gear set 40, 140, which is depicted in greater detail in FIG. 4a. This differential planetary gear set 40, 140 can preferably have at least a one-stage differential planet wheel 41, 141, a differential ring gear 13, 113 and a differential sun wheel 42, 142. As shown in FIG. 4, the differential ring gear 13 can preferably interact with the hub sleeve 9 via a clutch device 14, which clutch device 14 preferably engages in the driving direction of rotation and can preferably freewheel in the reverse direction of rotation. In the variant illustrated in FIG. 5, the differential sun wheel 142 is preferably mechanically connected to the hub sleeve 109 by means of a clutch device 114, which clutch device 114 can preferably be engaged in the driving direction of rotation and can preferably freewheel in the reverse direction.

The first planetary carrier 18, 118, in at least one embodiment of the present invention, can preferably have a threaded portion 10 on its lever-cone-side end, onto which threaded portion 10 a brake cone 5 can be screwed. The threaded portion 10 can essentially be realized as a right-handed thread with a steep thread patch so that the brake cone 5, the rotation of which can be restricted by a friction not indicated here, moves to the driving side to the block position when the first planetary carrier 18 rotates in the driving direction of rotation, and, when the first planetary carrier 18 rotates in the reverse direction, moves in the direction of the lever cone 2 toward a brake system 19. This brake system 19 preferably includes a brake shell 4 which can be made up of a number of parts, and which can removed outward against the hub sleeve 9 for the generation of frictional forces when one of the bevels of the brake cone 5 slips under the brake shell 4. This brake shell 4 can preferably be braced against the lever cone 2 and can transmit its rotational forces to the lever cone by means of an interlocking member, or dog clutch 37. The rotational forces are preferably supported against the frame 103' (FIG. 1a) of the bicycle by means of the arm 3, thereby essentially prohibiting rotation of the brake cone 5 during a braking action, or, in other words, during a frictional engagement of the brake cone 5 with the hub shell 9.

The clutch device 16, 116 connected to the first planetary carrier 18, 118 can preferably be actuated by means of a lifting apparatus 31, whereby this actuation functions automatically when moving backwards, or in other words, during a backpedalling, or braking action. If none of the sun wheels 34, 35 and 36 are located on the hub axle 1, the clutch device 16, 116 can preferably generate an additional direct speed, as can preferably the clutch device 17 on the second planetary gear set 21.

The cyclist can preferably use the liftable free wheels 44, 45, 46, 48 and 49, as well as the liftable clutch device 17, to manually select the individual speeds from the outside. Consider the first planetary gear set 20, 120, the function of which is essentially to drive a first ring gear 11, 111. The free wheels 44, 45 and 46 can preferably be sequentially lifted by means of the first control unit 32. In at least one embodiment of the invention, the control unit could possibly be a bar disposed within the bore 1a (see FIG. 1), which bar could preferably move the control plate 41 and cam 4a (see FIG. 1) between the free wheels 44, 45, 46 and the axle 1 to thereby block engagement with the axle 1.

For example, if the free wheels 44 and 45 are blocked, or lifted, the first planetary gear set 20, 120 can interact with the first ring gear 11, 111 via the free wheel 46 via the sun wheel 36 via the third stage 26 of the first multi-stage planet wheel 23 via the second stage 25. If the first control unit 32 is retracted, the free wheel 45 can preferably engage and support the sun wheel 35 against the hub axle 1. By means of the different speeds of the sun wheels 35 and 36, the speed of the engaged sun wheel 35 overtakes the freewheel 46, and the flow of force is via the free wheel 45, the sun wheel 35, the second stage 25 of the first multi-stage planet wheel 23 to the first ring gear 11, 111. Finally, if the first control unit 32 is further retracted so that the free wheel 44 is able to rest against the hub sleeve axle 1, the two free wheels 45 and 46 are outrun and the sun wheel 45 rests against the hub axle 1.

However, if the free wheels 44, 45 and 46 are lifted out (i.e., if the control unit 32 was possibly returned to the right), the clutch device 16, 116 can preferably be active in the drive direction with respect to the first ring gear 11, 111, thereby providing a direct connection between the first planetary carrier 18, 118 and the ring gear 11, 111. In essence, the clutch device 16, 116 would always be engaged in the drive direction, but when there is a connection between at least one of the freewheels and the hub axle 1, the clutch device 16, 116 would be outrun. This clutch device 16, 116 could preferably be in the form of a spring biased pawl clutch in at least one embodiment of the present invention, whereby the pawls can be biased outwardly to engage the inside of the ring gear 11, but when being outrun, the pawls can be depressed inwardly. Such clutch devices are essentially well known and will therefore not be discussed in any further detail herein.

As should essentially be clear from the configurations described above, there can thus preferably be four possible speeds with a three stage planetary gear 23. (For planetary gears having an alternative number of stages, the number of gears would essentially equal the number of stages plus one.) With the depicted embodiment of three stages, first, 811 three free wheels 44, 45 and 46 can be lifted out, thereby producing a direct drive by means of the clutch device 16, 116. Then the two free wheels 44 and 45 can be lifted out producing drive via the first stage 26. Then only the free wheel 44 can be lifted out producing drive via the second stage 25, and finally, when the control is removed and the free wheel 44 is able to rest against the hub axle 1, the drive would be provided by means of the third stage 24, during which configuration, the free wheels 45 and 46, as well as the clutch device 16 would be outrun.

She second planetary gear set 21 preferably includes two free wheels 48 and 49 and the clutch device 17. Instead of actuating both free wheels 48 and 49 by means of the second control unit 33, which could easily be done, the free wheel 49 and the clutch device 17 of the variants shown in FIGS. 4 and 5 can be actuated automatically, and the free wheel 48 can preferably be made to operate automatically. In a manner similar to that described above for the first planetary gear set 20, 120, the second planetary gear set 21, 121 can preferably produce three speeds (one more than the number of gear stages of the planet wheel 27). This second planetary gear set 21, 121, can preferably be provided to drive the second ring gear 12, 112 which can be rigidly connected to a differential sun wheel 42.

With this second planetary gear set 21, 121, a direct speed can preferably be achieved by lifting the lifting device 31 at the clutch device 17, thereby engaging the clutch device 17 to provide a direct connection between the first planetary carrier 18, 118 and the second ring gear 12, 112. In this case, the engaged free wheels 48 and 49 would be outrun. The next fastest speed is produced by lifting the clutch device 17 to disengage the clutch device 17, and lifting the free wheel 49, whereby the free wheel 48 can then drive. The fastest translation ratio can preferably be achieved by lifting the lifting device of the free wheel 49, thereby engaging the free wheel 49 so that the free wheel 49 can also be driven, as a result of which the free wheel 48 would be outrun. The clutch device 17 must remain raised, or disengaged.

As mentioned above, the free wheels 44, 45 and 46, as well as the clutch devices 14, 114 and 16, 116 preferably block forward relative to the driver 7, while the free wheels 48 and 49, as well as the clutch device 17 preferably block backward.

To achieve the 4 times 3 speeds, i.e., a total of 12 speeds, with the depicted embodiments of FIGS. 4 and 5, the power flow from the two planetary gazer sets 20, 120 and 21, 121 essentially must be consolidated. This can preferably be done by providing a differential planetary gear set 40, 140 at the hub sleeve 9, 109.

As shown in FIG. 4, the first ring gear 11 preferably acts on the second planetary carrier 22 as the first gear output from the first planetary gear set 20, whereby the clutch device 16 must essentially also be considered part of this gear output. The second ring gear 12, on which the clutch device 17 acts analogous to the first gear output, can essentially be considered to be the second gear output. As described above, the second ring gear 12 can be rigidly connected to the differential sun wheel 42. Thus, the two near outputs from the first and second planetary gear sets 20 and 21 can be unified in the differential planetary gear set 40 and coupled, via the differential planet wheel 41, with the differential ring gear 13 via a clutch device 14 of the hub sleeve 9, which assembly blocks in the driving direction of rotation.

In the second variant of the hub shift transmission shown in FIG. 5, the first ring gear 111 preferably acts on the second planetary carrier 122 as the first gear output from the first planetary gear set 120, whereby the clutch device 16, the driving portion of which is rigidly connected to the first planetary carrier 118, must likewise be considered part of this gear output, since it acts on the second planetary carrier 122. The second ring gear 112, on which the clutch device 17 acts analogous to the first gear output, can be considered the second gear output. However, in this embodiment, the second ring gear 112 preferably interacts with the differential ring gear 113, while the first ring gear 111 interacts with the second planetary carrier 122, by means of which the two gear outputs in the differential planetary gear set 140 are united via the differential planet wheel 141 and the power flow is transferred to the differential sun wheel 142. The output power then flows from the sun wheel 142, which is coupled with the hub sleeve 109 via the clutch device 114 which blocks in the driving direction of rotation.

Because of the multiplicity of the speeds, the following shift chart has been prepared to describe the function and shifting capabilities of the current hub shift transmission. This chart is essentially valid for both variants of the hub shift transmission, shown in FIGS. 4 and 5, in accordance with the present invention. In the chart, (A) indicates an external control action on the hub shift transmission, i.e., the respective free wheel or clutch device is lifted, or inactive. The resulting sequence is described with (s) and (u), where (s) means that the clutch device or the free wheel blocks, or drives, and (u) means that the clutch device or the free wheel is outrun. The capital letters indicate the cause and the small letters the effect.

driver 7. In one possible embodiment, the hub sleeve 9 could possibly turn a half revolution for each revolution of the driver 7. In further embodiments, depending on the sizes of the gears, other turning ratios would be possible, and it would be well within the skill of the artisan to provide desired turning ratios.

The second speed shifts the power transfer from free wheel 49 to the automatic free wheel 48 by lifting the free wheel 49. The multiplication in the second planetary gear set 21 becomes less, and the second ring gear 12 and the differential sun wheel 42 run slower, as a result of which the differential ring gear 13 and thus the hub sleeve 9 run correspondingly faster for a constant speed of the second planetary gear set 21. That is, the hub sleeve 9 would essentially turn a greater portion of a revolution for each revolution of the driver 7. In one possible embodiment, the hub sleeve 9 could possibly turn three-quarters of a revolution for each revolution of the driver 7.

The third speed can be achieved by lifting the lifting device at the clutch device 17 thereby engaging the clutch 17, as a result of which the second ring gear 12 is directly driven at a speed which is slower than the two speeds described above, or the direct speed of the driver 7 because of the direct connection. Since the clutch device 16 also blocks, bringing the second planetary carrier 22 to the driving speed, the differential sun wheel 42 and the differ-

SHIFTING CHART

| | | First planetary gear set 20, 120 | | | | Second planetary gear set 21, 121 | |
|---|---|---|---|---|---|---|---|
| Speed | Clutch 16 | Freewheel 44 | Freewheel 45 | Freewheel 46 | Clutch 17 | Freewheel 49 | Freewheel 48 |
| 1 | s | A | A | A | A | s | u |
| 2 | s | A | A | A | A | A | s |
| 3 | s | A | A | A | s | u | u |
| 4 | u | s | u | u | A | s | u |
| 5 | u | s | u | u | A | A | s |
| 6 | u | s | u | u | s | u | u |
| 7 | u | A | s | u | A | s | u |
| 8 | u | A | s | u | A | A | s |
| 9 | u | A | s | u | s | u | u |
| 10 | u | A | A | s | A | s | u |
| 11 | u | A | A | s | A | A | s |
| 12 | u | A | A | s | s | u | u |

For the depicted embodiments, the first speed can preferably be achieved by lifting the free wheels 44, 45 and 46, as well as the clutch device 17, as a result of which the first planetary carrier 18, 118 is connected directly to the first ring gear 11, 111 via the clutch device 16, by-passing the first planetary gear set 20, 120, while the free wheel 49 blocks and the sun wheel 39 for the second planetary gear set 21, 121 activates. The free wheel 48 preferably runs forward faster under no load, that is, the free wheel 40 is outrun. The second planetary carrier 22, via the direct engagement between the driver 7, carrier 18, ring gear 11, and carrier 22, can thus preferably run at the driving speed as shown in FIG. 4, while the differential sun wheel 42 turns with the highest step-up ratio. Inside the differential planetary gear set 40, this results in a relatively slower speed of the differential ring gear 13, by means of which the hub sleeve 9, driven via the clutch device 14, turns at its slowest speed, by means of which a hill-climbing speed with the greatest multiplication can be achieved. That is, the hub sleeve 9 would essentially turn only a portion of a revolution for each revolution of the ential ring gear 13 would both turn at the driving speed. The differential planet wheels 41 thus would essentially not rotate relative to the differential sun wheel 42 and the differential ring gear 13. The hub sleeve 9 can thus be carried along at the driving speed, which corresponds to a direct drive, or one revolution of the hub sleeve 9 for each revolution of the driver 7.

The fourth speed of the system can be achieved, in the second planetary gear set, from the third speed simply by lifting, or disengaging the clutch 17, or, from the second speed, by lifting the lifting device of the shiftable free wheel 49 to engage the free wheel 49. In addition, in the first planetary gear set 20, the lifting device of the free wheel 44 of the first planet wheel 23 can also be lifted, thus, engaging the free wheel 44, causing this free wheel 44 to block and forcing the free wheels 45 and 46 to be overrun, whether the free wheels 45 and 46 have been lifted or not. So that the second planetary gear set 21 may also be used for translation, the clutch device 17 is lifted. To generate the speed of the hub sleeve 9, the differential sun wheel 42 again rotates with maximum multiplication and the second planetary carrier 18 turns at the slowest speed of the first planetary gear set 20, but still faster than in direct gear, or faster than bypass of the first planetary gear set 20, when the clutch device 16 blocks, or drives.

With the above description of the first four speeds, it is believed that the principle of speed generation has been described with sufficient clarity with regards to the remaining speeds. However, a further mention will be made hereebelow with regard to the twelfth speed, which is reached when, to achieve the greatest overdrive multiplication, the differential sun wheel 42 turns as slowly as possible and the second planetary carrier 18 turns as fast as possible. The slowest speed for the differential sun wheel 42 can essentially be achieved by lifting the lifting device for the clutch device 17 to engage the clutch device 17, as a result of which the differential sun wheel 42 turns at the driving speed of the driver 7. The maximum speed of the second planetary carrier 18 through the first planetary gear set 20 can be achieved by means of the lifting of the lifting device of the free wheel 46 thereby engaging the freewheel 46. The free wheels 44 and 45 essentially must be lifted for the blocking of the free wheel 46. The clutch device 16 is thereby overrun. The differential ring gear 13 and thus the hub sleeve 9 reach their maximum multiplication ratio with respect to the first planetary carrier 18 with its driver 7 turning at the driving speed. Thus, a single revolution of the driver 7 can possibly produce multiple revolutions of the hub sleeve 9.

Everything said about the hub shift transmission shown in FIG. 4 with respect to the shifting sequence according to the shift chart can essentially apply to the generation of speeds for the hub shift transmission illustrated in FIG. 5. However, the effect on the hub sleeve 109 via the clutch device 114 differs by a greater or lesser degree depending on the configuration, whereby the spread and the gear intervals can be different. The difference can essentially be due to the fact that while the second planetary carrier 122 is still driven by the first planet gear set 120, the output of the second planetary gear set 121 is to the ring gear 113 and not sun wheel 142, while the output to the clutch device 114 and the hub sleeve 109 is via the differential sun wheel 142 and not the ring gear 113. If the rider shifts into a hill-climbing gear, the second planetary carrier 122 must turn as slowly as possible and the differential ring gear 113 must turn as fast as possible. As revealed by comparing this to the hill gear of the variant shown in FIG. 4, the fast speed comes from the second planetary gear set 121 and the slow speed comes from the first planetary gear set 120. The differential sun wheel 142 turns slowly and imparts this speed to the hub sleeve 109. The individual speeds can essentially be produced analogously and with no changes from the shifting chart which applies to the variant shown in FIG. 4, as described above.

The brake parts 4, 5 can preferably be activated by pedalling backwards and thus reversing the drive pinion 8 on the driver 7 of the first planetary carrier 18, 118 and finally the threaded portion 10, which is preferably non-rotationally connected to the first planetary carrier 18, 118. The brake cone 5, the rotation of which is limited by a function unit not shown here, preferably turns in the direction of the brake shell 4 and forces the shell 4 outward against the hub sleeve 9, 109, by means of which braking is initiated. The braking torque can essentially be transferred via the dog clutch 37 to the bicycle frame via the lever cone 2 end the arm 3. The clutch device 16 can preferably be equipped with lifting device 31 which can interrupt the power flow in the driving direction of rotation when the brake cone moves axially to ensure that there sufficient idle angle of rotation in the driving direction, that the brake can preferably be released. Alternatively, if it i.e. desired that a brake not be provided within the hub, one could eliminate the braking components from the hub, and, as is well within the skill of the artisan, provide brake pads or a disc brake etc. for the wheel, externally of the hub.

FIG. 6 depicts an alternative embodiment of a bicycle hub and components thereof which could possibly be interchangeable with similar components as discussed above. FIG. 6 shows cross-sectional view along the longitudinal axis of the hub and thereby essentially provides an actual depiction of components of a hub, as compared to the schematic illustrations of FIGS. 4 and 5.

The multi-speed bicycle wheel hub 10' illustrated in a simplified longitudinal section in FIG. 6 has, as its "core", a sun and planet gear mechanism 12', which makes the required gear ratios available by upshifting (to higher speeds) and downshifting (to lower speeds).

The sun and planet gear mechanism 12' preferably has a ring gear 14'. The inside circumference gearing 14a' of the ring gear 14' is preferably continuously engaged with planet wheels 16', of which there are at least two in each planetary transmission, for a balance of forces and for self-centering. In the normal case, there preferably are three planet wheels 16'. The planet wheels 16' can preferably be mounted by means of bearing bolts 18' on a common planet wheel carrier 20' so that they can rotate. The cage-like planet wheel carrier 20' is preferably mounted by means of a bearing segment 20a' so that it can rotate on a stationary hub axle 22'. The longitudinal axis of the hub axle 22' can preferably define an axis of rotation 24' of the bicycle wheel hub 10', around which the moving parts of the bicycle wheel hub 10' can rotate.

The planet wheels 16' are preferably designed in three stages with a large planet wheel stage 16a' having the maximum number of teeth, an intermediate planet wheel stage 16b' having an intermediate number of teeth, and a small planet wheel stage 16c' having the lowest number of teeth. The intermediate planet wheel stage 16b' is preferably continuously engaged with the ring gear 14'. All of the stages of the planet wheel, i.e. 16a', 16b', and 16c' are preferably continuously engaged with corresponding sun wheels 24a', 24b' and 24c'.

In a manner similar to that described above, for a switching of the gears, pawls 26' and 26' (similar to pawls 2a, 2b of FIGS. 1–3) can be engaged and disengaged from the axle 22' by means of a control plate 4' as described above with reference to FIGS. 1–3. The control plate 4' can be moved parallel to the axis of rotation 24', so that at least one of the sun wheels 24a', 24b', 24c' can be selected and fixed in a non-rotating manner on the hub axle 22'. In this depicted embodiment the pawls 26' are engaged with the axle 22' while the pawl 26" is disengaged, so that in essence, the gearing is being provided by the pawl 26' associated with the sun wheel 24b' and planet wheel 16b'.

The control member 4' is preferably connected via a block member 71' on a push rod 70' to a gear control member 75' disposed externally of the hub. The gear control member can essentially push the rod 70' by means of a user activated cable system as described earlier with reference to FIG. 1a and activated by the manual shifting mechanism 109' (see FIG. 1a) on the bicycle handlebars 108'. In addition, a biasing member 72' can preferably be provided to assist in returning the rod 70' to the left in FIG. 6.

A second pawl 28', which can also be connected to the manual shifting mechanism 109', and activated in a manner similar to the activation of the pawls 26' and 26", or an alternative known manner, can preferably be used to switch among three different force paths from a driver 30' supporting a sprocket wheel (not shown in FIG. 6), to a hub sleeve 33', to which are attached the bicycle spokes for the bicycle rim. The driver 30' is preferably mounted by means of a ball bearing 32' on the hub axle 22'. The hub sleeve 33' is preferably mounted on one end by means of a ball bearing 34' on the hub axle 22' and on the other end by means of a ball bearing 36' preferably on the driver 30'.

In the left end position of second pawl 28', designated 28" in FIG. 6, the force path can preferably run from the driver 30' by means of a clutch ring 38' with clutch gearing 38a', to a corresponding clutch gearing 20a' of the planet wheel carrier 20'. The planet wheel carrier 20' can, in turn, drive, by means of the planet wheels 16', the ring gear 14', and namely with a translation ratio which is preferably determined by the currently fixed sun wheel 24a' to 24c'. A freewheel clutch in the form of a locking pawl 40' essentially makes certain that the hub sleeve 33' moves along with the ring gear 14'. The high gear with the highest transmission ratio (in this embodiment, 7th gear) is preferably selected by fixing the largest sun wheel 24c'. The 6th and 5th gears are preferably selected by fixing the sun wheel 24b' or the sun wheel 24a' respectively.

By shifting the pawl 28' into an intermediate position designated 28''', the clutch ring 38' will essentially be moved to the right as shown in FIG. 6, whereby the clutch gearing 38a' is preferably disengaged from the clutch gearing 20a' of the planet wheel carrier 20', but is preferably still engaged with a corresponding clutch gearing 12a' of the ring gear 14'. The result is the direct 4th gear, in which the force flows via the clutch ring 38' to the ring gear 14' and via the pawl coupling 40' preferably to the hub sleeve 33'.

As a result of further shifting of the pawl 28' into the right limit position designated 28'''' in FIG. 6, the ring gear 14' with the clutch ring 38' is pushed to the right. Consequently, the pawl coupling is deactivated, since the pawls 40a' are pivoted radially inward as a result of a deflector surface 32a' on the inside circumference of the hub sleeve 33', and are thus disengaged from the radially inwardly projecting clutch projections 32b' of the hub sleeve 33'.

The force now flows from the driver 30' via the clutch ring 38' to the ring gear 14', and from the latter via the planet wheels 16' rolling on one of the sun wheels 24a' to 240' to the planet wheel carrier 20'. Its rotation is transmitted by an additional pawl coupling 44' to the hub sleeve 33'. This pawl coupling 44' is also overtaken in 7th, 6th and 5th gears by the more rapidly rotating hub sleeve 33'.

The rider can downshift (when travelling uphill), and, in particular, can downshift the least amount by activating the sun wheel 24a'. Preferably, this minimal shifting would correspond to 3rd gear. The rider can downshift an intermediate amount by activating the sun wheel 24b', and by the maximum amount when the sun wheel 240' is activated. Preferably, the intermediate shifting would correspond to 2nd gear, and the maximal shifting would correspond to 1st gear.

In all the gears, a braking device 46' makes possible an immediate deceleration of the hub sleeve 33' when the rider backpedals. For this purpose, a brake activation piece 48' is preferably mounted by means of a coarse screw thread 50' on the segment 20a' of the planet wheel carrier 20'. When the rider backpedals, a stationary pre-stressed spring 52' engaged with the brake part 48' can essentially guarantee that the brake part 48' is temporarily not co-rotating, and thus moves to the left in FIG. 6 toward brake Jaws 54', on account of the coarse screw thread. Corresponding angled surfaces on the brake activation part 48' and on the brake jaws 54' are pressed radially outward to make braking contact against the inside circumference surface of the hub sleeve 33'. Holding lugs 56a' on a hub flange 56' attached in a non-rotating manner to the hub axle 22' prevent co-rotation of the brake jaws 54'.

In a known manner, a series of prestress springs (i.e. spring 72') can preferably guarantee the return of the corresponding parts to their initial position.

One feature of the invention resides broadly in the control device for ratchet mechanisms for bicycle multispeed drive hubs, comprising at least one pawl $2a$, $2b$ biased radially inward by means of at least one spring $3a$, $3b$, whereby this ratchet mechanism non-rotationally couples a ring body 5' in one direction of rotation with another rotational body, in particular a hub axle 1, with at least one control device running parallel to the hub axle 1 to control the engagement of the pawl between the ring body 5' and the hub axle 1, characterized by the fact that the control device consists of at least one control plate 4' which is located in at least one groove $1b$ with a groove base $1c$ and groove sides $1d$, and in which the control plate 4' can be displaced longitudinally along a surface line of the hub axle, and which has at least one cam $4a$, which can be engaged with or disengaged from at least one pawl $2a$, $2b$.

Another feature of the invention resides broadly in the control device characterized by the fact that the pawls $2a$, $2b$ are mounted in the ring body 5' and are supported on the groove side $1d$ against the hub axle 1 to transmit torque.

Yet another feature of the invention resides broadly in the control device characterized by the fact that the groove side $1d$ has a bevel $1e$.

Still another feature of the invention resides broadly in the control device characterized by the fact that the control plate 4' has a forward bevel $4b$ and a rear bevel $4c$, each of which runs in the direction of displacement toward the cam $4a$.

A further feature of the invention resides broadly in the control device characterized by the fact that the cam $4a$ matches the cross section of the groove $1b$, whereby the lateral contour approximately matches the groove sides $1d$ and the bevels $1e$, and the height of the cam $4a$ approximately matches the circumference of the hub axle 1.

Another feature of the invention resides broadly in the control device characterized by the fact that the pawls $2a$ have ramp $2d$.

Types of transmissions for bicycles, end components thereof, which may be utilized in accordance with the embodiments of the present invention may be disclosed in the following U.S. Pat. Nos. 3,944,253 to Ripley on March 16, 1976, entitled "Infinitely variable Transmission for Pedal-Driven Vehicles"; 4,973,297 to Berglee on Nov. 27, 1990, entitled "Multispeed Drive Hub With More Than Three Speeds"; No. 4,721,015 to Hartmann on Jan. 26 1988, entitled "Three Stage Planetary Driving Wheel for Pedal Powered Vehicles"; No. 4,063,469 to Berglee on Dec. 20, 1977, entitled "Multiple Speed Hub for a Vehicle Wheel"; No. 4,727,965 to Zach et al.; No. 4,721,013 to Steuer et al.; No. 4,651,853 to Berglee et al.; No. 4,628,769 to Nagano; and No. 4,400,999 to Steuer; and No. 5,273,500.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 02 344.8, filed on Jan. 27, 1994, having inventors Gerhard Meier-Burkamp and werner Steuer, and DE-OS P 44 02 344.8 and DE-PS P 44 02 344.8, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A multi-speed hub for a bicycle having a frame, at least one wheel, and the multi-speed hub for mounting the at least one wheel to the frame, said hub comprising:

shaft means for being non-rotationally connected to a frame of a bicycle;

input means for inputting rotational power to the hub;

sleeve means disposed concentrically about said shaft means for receiving rotational power from said input means and for outputting rotational power to the at least one wheel, said sleeve means comprising means for being connected to the at least one wheel;

transmission means disposed within said sleeve means about said shaft means, said transmission means comprising:

at least one sun gear disposed about said shaft means, said at least one sun gear having an inner portion disposed adjacent said shaft means;

at least one planet gear disposed adjacent said at least one sun gear and meshed with said at least one sun gear;

at least one ring gear disposed concentrically about said at least one sun gear and disposed about said at least one planet gear, said at least one ring gear being meshed with said at least one planet gear;

said at least one sun gear comprising:

a first member disposed on said inner portion of said at least one sun gear; and means for biasing said first member towards said shaft means;

said shaft means comprising:

means for engaging said first member of said at least one sun gear for non-rotatably engaging said at least one sun gear with said shaft means;

means for withdrawing said first member out of engagement with said means for engaging and blocking re-engagement of said first member with said means for engaging to enable rotation of said at least one sun gear about said shaft means; and means for longitudinally displacing said means for withdrawing between at least a first position with said first member engaged with said means for engaging, and at least a second position with said first member blocked from engaging with said means for engaging.

2. The hub according to claim 1, wherein:

said means for withdrawing comprises a portion for being moved longitudinally between said first member and said shaft means, to radially outwardly displace said first member away from said means for engaging;

said portion for being moved between said first member and said shaft means being disposed substantially longitudinally adjacent said first member in said first position of said means for withdrawing; and said portion for being moved between said first member and said shaft means being disposed substantially radially between said first member and said shaft means in said second position of said means for withdrawing.

3. The hub according to claim 2, wherein:

said shaft means has an outer surface, and said shaft means comprises at least one groove disposed longitudinally along at least a portion of said outer surface;

said groove comprising said means for engaging; and said means for withdrawing comprises a second member slidably disposed within said groove, and slidably movable within said groove between said first position and said second position, said second member comprising said portion for displacing said first member out of engagement with said groove upon displacement of said second member from said first position to said second position.

4. The hub according to claim 3, wherein:

said groove has a cross-section transverse to said longitudinal direction of said groove; and said portion for displacing said first member comprises a cross-section for substantially filling said cross-section of said groove to radially displace said first member out of said groove and block said first member from re-engaging with said groove.

5. The hub according to claim 4, wherein:

said first member comprises a pawl pivotably mounted to said at least one sun gear, said pawl having a first end pivotably mounted to said at least one sun gear, and a second end biased away from said at least one sun gear towards said shaft means;

said second end of said pawl being engageable within said groove with said second member in said first position;

said groove has a base portion and two side portions defining said groove; and said second end of said pawl being engageable with one of said two side portions.

6. The hub according to claim 5, wherein:

said second member has a longitudinal base portion disposed adjacent said base portion of said groove;

said base portion having a length along the longitudinal dimension of said groove;

said portion for displacing has a length along the longitudinal dimension of said groove;

said length of said base portion being substantially greater than said length of said portion for displacing;

each of said base portion and said portion for displacing having a thickness, said thickness of said portion for displacing being greater than said thickness of said base portion for displacing said pawl out of said groove; and said second member additionally comprises at least one ramp portion adjacent said portion for displacing, said at least one ramp portion having a thickness increasing towards said portion for displacing from the thickness of said base portion to the thickness of said portion for displacing; and said second member being movable in at least one longitudinal direction to displace said pawl up said ramp portion and out of said groove.

7. The hub according to claim 6, wherein:

said groove has a width et the base portion, and a width at the outer surface of said shaft means;

said one side portion engaged by said pawl comprises a bevelled portion adjacent the outer surface of said shaft means and extending from said outer surface into said groove to a first distance from said base portion of said groove;

said bevelled portion being configured for engaging with said second end of said pawl, and said bevelled portion being disposed to squarely engage said second end of said pawl when said pawl is engaged in said groove to securely brace said pawl against said side portion of said groove.

8. The hub according to claim 7, wherein:

said portion for engaging comprises a cross-section to substantially match said cross-section of said groove, including said bevelled portion of said one side portion;

the outer surface of said shaft means has a circular contour;

said portion for engaging has an external contour disposed away from said base portion, and said external contour of said portion for engaging substantially matched the circular contour of the outer surface of said shaft means to guide said pawls about said shaft means during free rotation of said at least one sun gear about said shaft means.

9. The hub according to claim 8, wherein:

said pawl comprises an inner surface disposed towards said shaft means;

said inner surface comprises a bevel to smoothly guide said pawls about said shaft means during free rotation of said at least one sun gear about said shaft means;

said means for biasing comprises spring means;

said shaft means comprises a longitudinal bore;

said shaft means additionally comprises a slot extending from said longitudinal bore to said groove means;

said means for displacing comprises:

rod means disposed within said bore and longitudinally movable within said bore; and connecting means extending between said rod means and said second member to move said second member along with movement of said rod means.

10. The hub according to claim 9, wherein:

said first distance to which said bevelled portion of said one side portion extends from said base portion of said groove substantially equals the thickness of said base portion of said second member;

said portion for displacing has a first side disposed towards said ramp means, and a second side opposite said first side;

said second member comprises an additional ramp portion adjacent said second side of said portion for displacing for permitting displacing of said pawl in either longitudinal direction of movement of said second member in said groove;

said pawl has a longitudinal dimension between said first end and said second end, with a slot means substantially transverse to said groove and extending from said first end a substantial distance towards said second end;

said at least one sun gear comprises an annular groove disposed along the inner portion thereof;

said pawl being pivotably mounted within said groove;

said spring comprises an annular spring disposed about said shaft means within said annular groove of said at least one sun gear;

said spring passing through said slot means of said pawl to press said first end of said pawl radially outwardly from said shaft means to pivot said second end of said pawl radially inwardly towards said shaft means;

said at least one sun gear comprises at least two said pawls;

said shaft means comprises at least two said grooves, with each of said at least two said groove comprising a second member therein;

said hub comprises at least two said sun gears each comprising at least two said pawls;

said second members in each said groove being movable longitudinally within said grooves to selectively radially outwardly displace each said sun gear to selectively enable at least one said sun gear to freely rotate about said shaft means, and selectively enable said pawls of at least one said sun gear to be biased into at least one groove to selectively non-rotationally engage at least one said sun gear with said shaft means;

said shaft means has a first end end e second end; and said hub means further comprises adjacent one of said first end and second end, control means for displacing said rod means within said bore, said control means comprising means for being remotely operated at a position remote from said hub.

11. A controllable ratchet mechanism for a drive hub of a bicycle, the hub defining a longitudinal axis, and the hub comprising a first member and a second member with the second member disposed about the first member, the first member having an outer surface disposed towards the second member, and the second member having an inner surface disposed towards the first member, the first and second members being selectively rotatable relative to one another, and selectively non-rotatably engageable with one another, said ratchet mechanism comprising:

at least one pawl pivotably mounted on the inner surface of the second member, said at least one pawl having a first end mounted to the second member and a second end opposite the first end;

means for engaging said second end of said at least one pawl for non-rotatably engaging the first member and the second member, the first member comprising said means for engaging;

control means for controlling engagement and disengagement of said at least one pawl between the second member and the first member, the first and second members being relatively rotatable with respect to one another upon disengagement of said at least one pawl, and the first and second members being non-rotatably engaged with one another upon engagement of said at least one pawl, said control means comprising:

at least one third member for disengaging said at least one pawl from said means for engaging and for blocking re-engagement of said at least one pawl with said means for engaging to enable relative rotation between the first and second members; and means for longitudinally displacing said third member between at least a first position with said at least one pawl engaged with said means for engaging, and at least a second position with said at least one pawl blocked from engaging with said means for engaging.

12. The ratchet mechanism according to claim 11, wherein:

said at least one third member comprises a portion for being moved longitudinally between said at least one pawl and said first member, to radially outwardly displace said at least one pawl away from said means for engaging;

said portion for displacing being disposed substantially longitudinally adjacent said at least one pawl in said first position of said at least one third member; and said portion for displacing being disposed substantially radially between said at least one pawl and the first member in said second position of said at least one third member.

13. The ratchet mechanism according to claim 12, wherein:

the outer surface of the first member comprises at least one groove disposed longitudinally along at least a portion of the outer surface;

said groove comprises said means for engaging;

said third member being slidably disposed within said groove, and slidably longitudinally movable within said groove between said first position and said second position; and said portion for displacing comprises means for displacing said at least one pawl out of engagement with said groove upon displacement of said third member from said first position to said second position.

14. The ratchet mechanism according to claim 13, wherein:

said mechanism further comprises biasing means for biasing said second end of said at least one pawl radially inwardly away from said second member and into said groove;

said groove has a cross-section transverse to said longitudinal direction of said groove; and said portion for displacing comprises a cross-section for substantially filling said cross-section of said groove to radially displace said at least one pawl out of said groove and block said at least one pawl from re-engaging with said groove.

15. The ratchet mechanism according to claim 14, wherein:

said first end of said at least one pawl is pivotably mounted to the second member;

said second end of said at least one pawl being engageable within said groove with said third member in said first position;

said groove has a base portion and two side portions defining said groove; and said second end of said at least one pawl being engageable with one of said two side portions.

16. The ratchet mechanism according to claim 15, wherein:

said third member has a longitudinal base portion disposed adjacent said base portion of said groove;

said base portion having a length along the longitudinal dimension of said groove;

said portion for displacing has a length along the longitudinal dimension of said groove;

said length of said base portion being substantially greater than said length of said portion for displacing;

each of said base portion and said portion for displacing having a thickness, said thickness of said portion for displacing being greater than said thickness of said base portion for displacing said pawl out of said groove;

said third member additionally comprises at least one ramp portion adjacent said portion for displacing, said at least one ramp portion having a thickness increasing towards said portion for displacing from the thickness of said base portion to the thickness of said portion for displacing; and said third member being movable in at least one longitudinal direction to displace said pawl up said ramp portion and out of said groove.

17. The ratchet mechanism according to claim 16, wherein:

said groove has a width at the base portion, and a width at the outer surface of said first member;

said one side portion engaged by said pawl comprises a bevelled portion adjacent the outer surface of said first member and extending from said outer surface into said groove to a first distance from said base portion of said groove;

said bevelled portion being configured for engaging with said second end of said pawl, and said bevelled portion being disposed to squarely engage said second end of said pawl when said pawl is engaged in said groove to securely brace said pawl against said side portion of said groove.

18. The ratchet mechanism according to claim 17, wherein:

said portion for displacing comprises a cross-section to substantially match said cross-section of said groove, including said bevelled portion of said one side portion;

the outer surface of said first member has a circular contour;

said portion for displacing has an external contour disposed away from said base portion, and said external contour of said portion for displacing substantially matches the circular contour of the outer surface of said first member to guide said at least one pawl about said first member during relative rotation between said second member and said first member.

19. The ratchet mechanism according to claim 18, wherein:

said at least one pawl comprises an inner surface disposed towards said first member;

said inner surface comprises a bevel to smoothly guide said at least one pawl about said first member during relative rotation between said at least one sun gear and said shaft means;

said means for biasing comprises spring means;

said first member comprises shaft means of the hub, the shaft means being configured for being non-rotationally connected to a frame of a bicycle;

said shaft means comprises a longitudinal bore;

said shaft means additionally comprises a slot extending from said longitudinal bore to said groove means;

said means for displacing comprises:
rod means disposed within said bore and longitudinally movable within said bore; and connecting means extending between said rod means and said third member to move said third member along with movement of said rod means.

20. The hub according to claim 19, wherein:

said second member comprises a sun gear disposed about said shaft means;

said first distance to which said bevelled portion of said one side portion extends from said base portion of said groove substantially equals the thickness of said base portion of said third member;

said portion for displacing has a first side disposed towards said ramp means, and a second side opposite said first side;

said third member comprises an additional ramp portion adjacent said second side of said portion for displacing for permitting displacing of said at least one pawl in either longitudinal direction of movement of said third member in said groove;

said at least one pawl has a longitudinal dimension between said first end and said second end, and said at least one pawl comprises slot means substantially transverse to said groove and extending from said first end a substantial distance towards said second end;

said sun gear comprises an annular groove disposed along the inner portion thereof;

said at least one pawl being pivotably mounted within said annular groove;

said biasing means comprises an annular spring disposed about said shaft means within said annular groove of said sun gear;

said spring passing through said slot means of said at least one pawl to press said first end of said pawl radially outwardly from said shaft means to pivot said second end of said pawl radially inwardly towards said shaft means;

said sun gear comprises at least two said pawls;

said shaft means comprises at least two said grooves, with each of said at least two said grooves comprising a third member therein;

the hub comprises at least two said sun gears each comprising at least two said pawls; and said second members in each said groove being movable longitudinally within said grooves to selectively radially outwardly displace said pawls of each said sun gear to selectively enable at least one said sun gear to freely rotate about said shaft means, and selectively enable said pawls of at least one said sun gear to be biased into at least one groove to selectively non-rotationally engage at least one said sun gear with said shaft means.

* * * * *

UNITED STATES PATENT AND TRADEMARK OFFICE
CERTIFICATE OF CORRECTION

PATENT NO. : 5,540,456  
DATED : July 30, 1996  
INVENTOR(S) : Gerhard MEIER-BURKAMP and Werner STEUER Page 1 of 3

It is certified that error appears in the above-indentified patent and that said Letters Patent is hereby corrected as shown below:

On the title page, item [56], under the "References Cited" section, insert the following U.S. Patent Documents section:

```
--U.S. PATENT DOCUMENTS
4,283,969     8/1981     Lapeyre
5,273,500     12/1993    Nagano
5,443,279     8/1995     Nurnberger--
```

In column 1, line 25, after 'a', delete "rang" and insert --ring--.

In column 5, line 17, after 'additional', delete "fun" and insert --sun--.

In column 6, line 12, after 'slot', delete "of" and insert --2f--.

In column 6, line 18, after 'rocker', delete "am" and insert --arm--.

In column 9, line 63, before 'three', delete "811" and insert --all--.

In column 10, line 7, before 'second', delete "She" and insert --The--.

In column 14, line 1, after 'there' insert --is a--.

In column 14, line 2, after 'direction,' insert --so--.

UNITED STATES PATENT AND TRADEMARK OFFICE
CERTIFICATE OF CORRECTION

PATENT NO. : 5,540,456
DATED : July 30, 1996
INVENTOR(S) : Gerhard MEIER-BURKAMP and Werner STEUER It is certified that error appears in the above-indentified patent and that said Letters Patent is hereby corrected as shown below:

In column 14, line 3, after 'it', delete "i.e." and insert --is--.

In column 14, line 46, after 'and', delete the second occurrence of " 26' " and insert --26''--.

In column 15, line 45, after the first occurrence of 'to', delete " 240' " and insert --24c'--.

In column 15, line 55, after 'wheel', delete " 240' " and insert --24c'--.

In column 16, line 47, after 'have' insert --a--.

In column 16, line 52, after ' "Infinitely ', delete "variable" and insert --Variable--.

In column 16, line 53, after 'to', delete "Berglee" and insert --Bergles--.

In column 16, line 57, after 'to', delete "Berglee" and insert --Bergles--.

In column 16, line 60, after the first occurrence of 'to', delete "Berglee" and insert --Bergles--.

UNITED STATES PATENT AND TRADEMARK OFFICE
CERTIFICATE OF CORRECTION

PATENT NO. : 5,540,456
DATED : July 30, 1996
INVENTOR(S) : Gerhard MEIER-BURKAMP and Werner STEUER It is certified that error appears in the above-indentified patent and that said Letters Patent is hereby corrected as shown below:

In column 19, line 32, Claim 8, after 'substantially', delete "matched" and insert --matches--.

In column 20, line 30, Claim 10, after the first occurrence of 'end', delete "end e" and insert --and a--.

Signed and Sealed this

Eighteenth Day of February, 1997

Attest:

BRUCE LEHMAN

Attesting Officer

Commissioner of Patents and Trademarks